(12) United States Patent
Drozt et al.

(10) Patent No.: US 6,640,109 B1
(45) Date of Patent: Oct. 28, 2003

(54) METHOD AND APPARATUS FOR INTERURBAN DISPATCH GROUP CALLING

(75) Inventors: Peter M. Drozt, Prairie Grove, IL (US); Tracy L. Wolf, Elgin, IL (US); William A. Felderman, Sr., Cary, IL (US); Paul M. Erickson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/177,954

(22) Filed: Jun. 21, 2002

(51) Int. Cl.[7] ................................................ H04B 7/00
(52) U.S. Cl. ....................................................... 455/508
(58) Field of Search ................................. 455/518, 519, 455/521, 508, 404.1, 517, 422, 507–510

(56) References Cited

U.S. PATENT DOCUMENTS

| | | | | |
|---|---|---|---|---|
| 5,369,783 A | * | 11/1994 | Childress et al. ............. 455/17 |
| 5,493,695 A | * | 2/1996 | Aitkenhead et al. ......... 455/509 |
| 5,924,041 A | * | 7/1999 | Alperovich et al. ...... 455/456.1 |
| 5,999,820 A | * | 12/1999 | Sutanto et al. ............... 455/508 |
| 6,002,941 A | * | 12/1999 | Ablay et al. ................. 455/518 |
| 6,138,011 A | * | 10/2000 | Sanders et al. ........... 455/426.1 |
| 6,308,079 B1 | * | 10/2001 | Pan et al. .................... 455/519 |
| 6,545,995 B1 | * | 4/2003 | Kinnunen et al. ........... 370/341 |
| 6,577,874 B1 | * | 6/2003 | Dailey ......................... 455/521 |

\* cited by examiner

*Primary Examiner*—Nay Maung
*Assistant Examiner*—Tan Trinh
(74) *Attorney, Agent, or Firm*—Jeffrey K. Jacobs

(57) ABSTRACT

To address the need to provide interurban dispatch services, embodiments supporting an interurban dispatch group call service are disclosed. Call control in the controlling network equipment (e.g., 110–131) manages the dispatch service in both the local urban area (101) and the remote urban areas (151). Call flow embodiments that enable this management of group call service across urban area boundaries are described in detail.

29 Claims, 2 Drawing Sheets

METHOD AND APPARATUS FOR INTERURBAN DISPATCH GROUP CALLING

CROSS-REFERENCE TO RELATED APPLICATION

This application is related to a co-pending application entitled "METHOD AND APPARATUS FOR INTERURBAN DISPATCH PRIVATE CALLING," filed on even date herewith, assigned to the assignee of the instant application, and hereby incorporated by reference.

FIELD OF THE INVENTION

The present invention relates generally to communication systems and, in particular, to interurban dispatch communication systems.

BACKGROUND OF THE INVENTION

Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call. A dispatch group call is ideal for a team of people who are working together as a group and often need to speak with one another spontaneously.

Likewise, the dispatch individual call service (typically a private call or call alert) enables a user to communicate with another user quickly and spontaneously. This feature is ideal for two people who are working together but are unable to speak with one another directly. Where a wireless telephone call is more appropriate for a conversation, short messages between two people as they work are better facilitated by the dispatch individual call service.

Today, Motorola's "iDEN" system provides such dispatch services, but only within limited service areas called urban areas. Thus, an "iDEN" user is currently able to make dispatch group calls and dispatch private calls to other users located in the same urban area. However, when one of these users leaves the urban area (travels to another city, for example) and registers in a new urban area, dispatch services with those in the old urban area are no longer available.

Therefore, a need exists for a method and apparatus to provide interurban dispatch services.

DETAILED DESCRIPTION OF EMBODIMENTS

To address the need to provide interurban dispatch services, embodiments supporting an interurban dispatch group call service are disclosed. Call control in the controlling network equipment manages the dispatch service in both the local urban area and the remote urban areas. Call flow embodiments that enable this management of group call service across urban area boundaries are described in detail.

Figure 1:
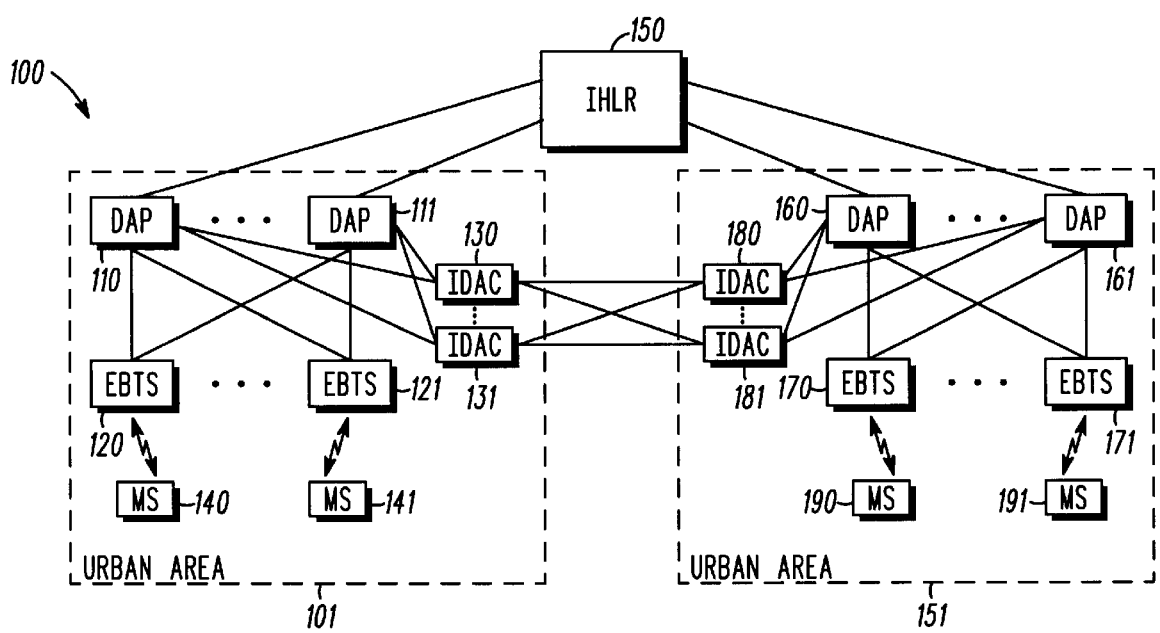
FIG. 1 is a block diagram depiction of a communication system in accordance with an embodiment of the present invention.
Figure 2:
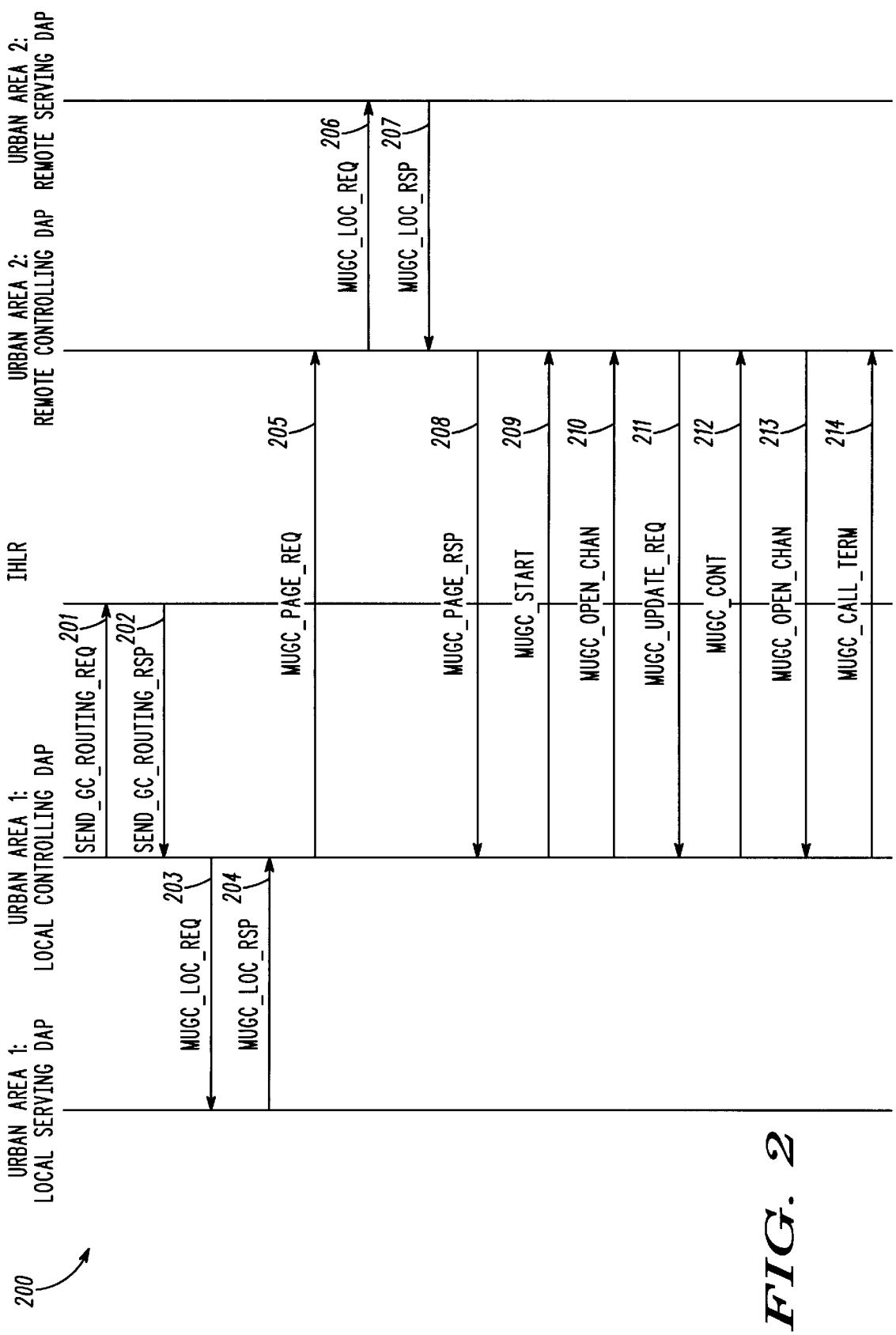
FIG. 2 is a call flow chart illustrating messaging exchanged by system components in accordance with an embodiment of the present invention.

The disclosed embodiments can be more fully understood with reference to FIGS. 1 and 2. FIG. 1 is a block diagram depiction of a communication system 100 in accordance with an embodiment of the present invention. System 100 comprises an "iDEN" communication system, commercially available from Motorola, Inc. of Schaumburg, Ill., divided into constituent urban areas. Although urban areas 101 and 151 are depicted in FIG. 1, the person of skill in the art will recognize that system 100 may embody additional urban areas. Although urban areas typically refer to "iDEN" systems that provide service to distinct geographical regions, the person of skill will also recognize that an urban area may refer to another type of system (or non-iDEN device) that interfaces with an otherwise "iDEN" system by supporting an interurban interface.

System 100 comprises "iDEN" dispatch application processors (DAPs) 110, 111, 160, and 161, which serve as dispatch controllers (DCs), and interface to "iDEN" home location register (IHLR) 150. The DAPs also interface with the base sites, i.e., the "iDEN" enhanced base transceiver systems (EBTSs) 120, 121, 170, and 171. As depicted in FIG. 1, EBTSs 120, 121, 170, and 171 provide wireless service to mobile stations 140, 141, 190, and 191, respectively. However, the present invention is not limited to communication units that are mobile. For example, a communication unit may comprise a computer wirelessly connected to system 100 or a computer connected to system 100 via the Internet. DAPs 110, 111, 160, and 161 also interface with "iDEN" Dispatch Access Controllers (IDACs) 130, 131, 180, and 181, which provide system 100's interurban bearer connections between urban area 101 and urban area 151.

Those skilled in the art will recognize that FIG. 1 does not depict all of the network equipment and equipment components necessary for system 100 to operate. FIG. 1 only depicts a simplified diagram of those system entities particularly relevant to the description of embodiments of the present invention. For example, DAPs 110, 111, 160, and 161 are each dispatch controllers, which comprise a network transceiver and a processor, both well-known entities. Those skilled in the art are aware of the many ways each of these entities can be implemented and/or purchased from wireless communications companies such as "MOTOROLA." Processors, for example, typically comprise components such as microprocessors, memory, and/or logic circuitry designed to implement algorithms that have been expressed as computer instructions and/or in circuitry. Furthermore, processors are known to interface with network transceivers in order to communicate with other devices via data communication networks and/or dedicated communication links. Given an algorithm, a logic flow, or a messaging flow, those skilled in the art are aware of the many design and development techniques available to implement a processor that performs the specified logic and communicates via a network transceiver as required. Moreover, those skilled in the art will recognize that the dispatch controller aspect of the present invention may be implemented in and across various physical components of system 100, not just in the DAPs.

Operation of system 100, in accordance with an embodiment of the present invention, occurs substantially as follows with reference to FIGS. 1 and 2. FIG. 2 is a call flow chart illustrating messaging exchanged by system components in accordance with the present embodiment. Assume that the user of MS 140 desires to talk with the members of a dispatch talkgroup using the dispatch group call service. MS 140, the originating unit, transmits a service request to its serving site, EBTS 120, which routes the service request to DAP 110. In some embodiments, this routing may be via another DAP, such as MS 140's serving DAP.

In one embodiment of the present invention, DAP 110 is designated as the controlling DAP for the talkgroup in urban area 101. Similarly, DAP 160 may be designated as the controlling DAP for the talkgroup in urban area 151. Since the originating unit, MS 140, is in urban area 101, the local controlling DC, DAP 110, becomes the call controlling DC for the dispatch group call, and the controlling DC in urban area 151, DAP 160, becomes a remote controlling DC for the call. Such a pre-determined mapping of dispatch controllers to particular talkgroups within urban areas and the selection of the local controlling DC as the call controlling DC is but one way of architecting interurban group call processing. Certainly other schemes may be employed instead, such as pre-determining which dispatch controller in which urban area is the call controlling DC for all interurban group calls, regardless where originated. Such an alternate embodiment may rely on a home location register to indicate which dispatch controller is the call controlling DC for a given talkgroup. Moreover, the controlling DCs for a talkgroup in each urban area need not be pre-determined. Rather, the controlling DC may be simply the first dispatch controller to which a talkgroup member registers in that urban area.

Thus, DAP 110, the call controlling DC for the talkgroup indicated receives the dispatch group call request from MS 140. This call request targets talkgroup members MS 141, MS 190, and MS 191. The call controlling DC needs to determine what remote controlling DCs are required to support the group call, since the call controlling DC manages the interurban call by coordinating with the appropriate remote controlling DCs. In the present embodiment, DAP 110 sends (201) a SEND_GC_ROUTING_REQUEST message to IHLR 150 to determine what remote controlling DCs serve the talkgroup requested. Although the present embodiment accesses a home location register, other embodiments may involve accessing other types of databases or caches that contain the needed talkgroup mobility information.

DAP 110 receives (202) a SEND_GC_ROUTING_RESPONSE from IHLR 150 that identifies the remote controlling DC, DAP 160. Although only one remote controlling DC is involved in the call being described, multiple remote controlling DCs would be involved (and would be identified in the SEND_GC_ROUTING_RESPONSE message) in the call if communication units in other urban areas were members of the requested talkgroup.

To notify the talkgroup members of the group call request, they are paged. For the communication units in the call controlling DC's local urban area, the call controlling DC (DAP 110) sends (203) a MUGC_LOC_REQUEST message to the DCs that serve each communication unit. In the present embodiment, each communication unit has a serving DC that tracks which location area the communication unit is in. The MUGC_LOC_REQUEST message requests the paging location area information for the talkgroup members that the serving DC serves. Assuming that DAP 111 is MS 141's serving DC, DAP 110 sends DAP 111 a MUGC_LOC_REQUEST message requesting MS 141's current paging location area. DAP 111 responds (204) with a MUGC_LOC_RESPONSE message indicating MS 141's current paging location area. DAP 110 now proceeds to page MS 141.

For the talkgroup members not in the call controlling DC's local urban area, the call controlling DC (DAP 110) sends (205) a MUGC_PAGE_REQUEST message to the remote controlling DCs identified in the SEND_GC_ROUTING_RESPONSE message. The MUGC_PAGE_REQUEST message requests that the talkgroup members served by the receiving remote controlling DC be paged. In the present embodiment, the MUGC_PAGE_REQUEST message also identifies a bearer gateway in urban area 101 to support the dispatch group call. As described above with respect to the call controlling DC, each remote controlling DC sends/receives MUGC_LOC_REQUEST/MUGC_LOC_RESPONSE messages to their urban area's serving DCs, which track talkgroup members. Using the paging location area information received, each remote controlling DC pages the talkgroup members served. Assuming that DAP 161 is MS 190 and 191's serving DC, DAP 160 sends (206) DAP 161 a MUGC_LOC_REQUEST message requesting MS 190 and 191's current paging location area. DAP 161 responds (207) with a MUGC_LOC_RESPONSE message indicating MS 190 and 191's current paging location area. DAP 160 now proceeds to page MS 190 and 191.

In the present embodiment, a remote controlling DC will respond with a MUGC_PAGE_RESPONSE message after one or more (but not necessarily all) communication units paged respond. Thus, upon receiving a page response from either MS 190 or MS 191, DAP 160 sends (208) a MUGC_PAGE_RESPONSE message to DAP 110. In an alternate embodiment, a remote controlling DC may respond with a MUGC_PAGE_RESPONSE message without/before any page responses are received. Presumably, this implementation could shorten the group call setup or access time. In the present embodiment, the MUGC_PAGE_RESPONSE message also indicates that channel resources required to support the dispatch group call are available in urban area 151, specifically identifying a bearer gateway to support the call. When the requisite channel resources are not available to support a call, such a call may be queued and additional messaging necessary once the resources become available.

Having received a MUGC_PAGE_RESPONSE message indicating that channel resources are available for the call, DAP 110 sends (209) a MUGC_START message requesting DAP 160 to initialize the channel resources to support the dispatch group call. Thus, both DAP 110 and DAP 160 prepare for transmission of the call. Once call setup is complete, e.g., the requisite wireless and interurban channels initialized, the group call transmission from MS 140 to MS 141, 190, and 191 is performed. If additional urban areas, i.e., remote controlling DCs, respond with MUGC_PAGE_RESPONSE messages, a MUGC_START message would be sent to each requesting initialization of their channel resources also. Note that a page response may have already been received by the call controlling DC and the call started before receiving the MUGC_PAGE_RESPONSE message. In this case DAP 160 may be joined to an active call, using the same messaging. Thus, a MUGC_PAGE_RESPONSE message can be received during any part of the group call. For example a response from a remote controlling DC not depicted could be received while the originator is transmitting.

When MS 140 finishes transmitting, thereby completing the first transmit session of the call, DAP 110 receives an end-of-transmission indication and sends (210) a MUGC_OPEN_CHAN message to DAP 160, indicating that MS 140 is finished transmitting. Upon receiving the MUGC_OPEN_CHAN message, DAP 160 notifies MS 190 and 191 that MS 140 has completed the transmit session. DAP 110 also notifies MS 141 that MS 140 has completed the transmit session. If additional urban areas, i.e., remote controlling DCs, were involved in the call, a MUGC_OPEN_CHAN message would be sent to each of them as well.

Since MS 140 has completed its first transmit session, the group call is presently without a talker. For the sake of illustration, assume that the user of MS 190 desires to talk. The user depresses MS 190's push-to-talk button, and DAP 160, after receiving a request to talk from MS 190, sends (211) a MUGC_UPDATE_REQUEST message to DAP 110 indicating MS 190's request to talk. DAP 110 receives the MUGC_UPDATE_REQUEST message and determines whether talk privileges remain unassigned. (It is possible that MS 140 has requested to talk again, for example, and DAP 110 has already granted talk privileges to MS 140.) If not already granted, DAP 110 sends (212) a MUGC_CONT message to DAP 160 indicating that MS 190 is granted talk privileges for a transmit session. Upon receiving the MUGC_CONT message, DAP 160 notifies MS 190 of its turn to transmit.

When MS 190 finishes transmitting, thereby completing the second transmit session of the call, DAP 160 receives an end-of-transmission indication and sends (213) a MUGC_OPEN_CHAN message to DAP 110, indicating that MS 190 is finished transmitting. Upon receiving the MUGC_OPEN_CHAN message, DAP 110 notifies MS 140 and 141 that MS 190 has completed the transmit session. If additional urban areas, i.e., remote controlling DCs, were involved in the call, a MUGC_OPEN_CHAN message would need to be sent to each of them as well. DAP 160 also notifies MS 191 that MS 190 has completed the transmit session. At this point any MS of the talkgroup can request to become the next transmitter. If neither MS 140, 141, 190, nor 191 requests to talk for a pre-determined period of time (the "hang time" as it is referred to in dispatch), DAP 110 will send (214) a MUGC_CALL_TERM message indicating to DAP 160 to terminate the call.

During calls in the present embodiment, the call controlling DC performs call status checking to ensure that the call controlling DC and the remote controlling DCs remain synchronized with respect to call states. A MUGC_DAP_DAP_CSC_REQ message is sent upon a timer expiration (e.g., 45 seconds), and thus, may be sent during various phases of a call. The MUGC_DAP_DAP_CSC_REQ message indicates the present state of the call according to the call controlling DC. Possible call states include "Waiting for Resources," "Paging Target," "Pre-Call Start," "Originator Transmitting," "Hang Time," and "Target Transmitting".

A receiving remote controlling DC compares the message call state to its determination of the call state. If the received call state is not valid based upon the current state, the receiving remote controlling DC proceeds to tear the call down in its urban area and sends an indication to the call controlling DC that it is no longer participating in the call. Otherwise the receiving remote controlling DC the MUGC_DAP_DAP_CSC_REQ message with a MUGC_DAP_DAP_CSC_RSP message to the call controlling DC indicating that the call states are synchronized.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for interurban dispatch group calling comprising:

receiving, by a call controlling dispatch controller (DC), a dispatch group call request targeting a talkgroup served remotely by at least one remote controlling DC and targeting at least one communication unit, wherein the at least one communication unit is a member of the talkgroup, wherein the dispatch group call request is received from an originating unit;

sending, by the call controlling DC to the at least one remote controlling DC, a request for the at least one remote controlling DC to page members of the talkgroup that each of the at least one remote controlling DC serve;

receiving, by the call controlling DC from a first remote controlling DC of the at least one remote controlling DC, an indication that at least one communication unit is available; and sending, by the call controlling DC to the first remote controlling DC, a request for the first remote controlling DC to initialize channel resources to support a dispatch group call.

2. The method of claim 1 further comprising:

receiving, by the call controlling DC from a second remote controlling DC of the at least one remote controlling DC, an indication that at least one communication unit is available; and sending, by the call controlling DC to the second remote controlling DC, a request for the second remote controlling DC to initialize channel resources to support a dispatch group call.

3. The method of claim 2, wherein the call controlling DC is part of a first urban area, the first remote controlling DC is part of a second urban area, and the second remote controlling DC is part of a third urban area.

4. The method of claim 1 further comprising:

paging, by the call controlling DC, communication units of the at least one communication unit located locally.

5. The method of claim 4, wherein paging further comprises:

sending, by the call controlling DC to at least one local serving DC, a request for paging location area information for communication units of the at least one communication unit served by the at least one local serving DC; and receiving, by the call controlling DC from the at least one local serving DC, paging location area information for communication units of the at least one communication unit served by the at least one local serving DC.

6. The method of claim 1 further comprising:

receiving, by the call controlling DC, an indication that the originating unit has completed a transmit session; and sending, by the call controlling DC to the first remote controlling DC, an indication that the originating unit has completed the transmit session.

7. The method of claim 1 further comprising:

receiving, by the call controlling DC from the first remote controlling DC, an indication that channel resources required to support the dispatch group call request are available to the first remote controlling DC.

8. The method of claim 7, wherein receiving the indication that channel resources are available further comprises:

receiving, by the call controlling DC from the first remote controlling DC, an indication of a bearer gateway available to the first remote controlling DC to support the dispatch group call request.

9. The method of claim 1, wherein sending the request to page members of the talkgroup further comprises:

sending, by the call controlling DC, an indication of a bearer gateway available to the call controlling DC to support the dispatch group call request.

10. The method of claim 1 further comprising:

transmitting, by the call controlling DC, a routing request message to a home location register; and receiving, by the call controlling DC, a response to the routing request message that identifies the at least one remote controlling DC serving the talkgroup.

11. The method of claim 1 further comprising:

sending, by the call controlling DC to the first remote controlling DC, an indication of a present local call state; and receiving, by the call controlling DC from the first remote controlling DC, an indication that a present remote call state is synchronized with the present local call state.

12. The method of claim 1 further comprising:

receiving, by the call controlling DC from the first remote controlling DC, an indication that a communication unit has requested to talk;

determining, by the call controlling DC, whether talk privileges remain unassigned;

sending, by the call controlling DC to the first remote controlling DC, an indication that the communication unit is granted talk privileges for a transmit session; and receiving, by the call controlling DC from the first remote controlling DC, an indication that the communication unit has completed the transmit session.

13. The method of claim 1 further comprising:

sending, by the call controlling DC to the first remote controlling DC, an indication to terminate support of the dispatch group call request.

14. The method of claim 1 further comprising:

receiving, by the call controlling DC from the first remote controlling DC, an indication to terminate support of the dispatch group call request.

15. A method for interurban dispatch group calling comprising:

receiving, by a remote controlling dispatch controller (DC), a request for the remote controlling DC to page members of a talkgroup that the remote controlling DC serves, wherein the talkgroup is targeted by a dispatch group call request and wherein the talkgroup is served by a call controlling DC;

sending, by the remote controlling DC to the call controlling DC, an indication that at least one communication unit is available; and receiving, from the call controlling DC, a request for the remote controlling DC to initialize channel resources to support the dispatch group call request.

16. The method of claim 15 further comprising:

paging, by the remote controlling DC, the members of the talkgroup that the remote controlling DC serves.

17. The method of claim 16, wherein paging further comprises:

sending, by the remote controlling DC to at least one remote serving DC, a request for paging location area information for the members of the talkgroup that the remote controlling DC serves; and receiving, by the remote controlling DC from the at least one remote serving DC, paging location area information for the members of the talkgroup that the remote controlling DC serves.

18. The method of claim 15 further comprising:

receiving, by the remote controlling DC from the call controlling DC, an indication that an originating unit has completed a transmit session, wherein the originating unit is served by the call controlling DC; and sending, by the remote controlling DC to members of the talkgroup that the remote controlling DC serves, an indication that the originating unit has completed the transmit session.

19. The method of claim 15 further comprising:

sending, by the remote controlling DC to the call controlling DC, an indication that channel resources required to support the dispatch group call request are available to the remote controlling DC.

20. The method of claim 19, wherein sending the indication that channel resources are available further comprises:

sending, by the remote controlling DC to the call controlling DC, an indication of a bearer gateway available to the first remote controlling DC to support the dispatch group call request.

21. The method of claim 15, wherein receiving the request to page comprises:

receiving, by the remote controlling DC from the call controlling DC, an indication of a bearer gateway available to the call controlling DC to support the dispatch group call request.

22. The method of claim 15 further comprising:

receiving, by the remote controlling DC from a member of the talkgroup that the remote controlling DC serves, a request to talk;

sending, by the remote controlling DC to the call controlling DC, an indication that the member has requested to talk;

receiving, by the remote controlling DC from the call controlling DC, an indication that the member is granted talk privileges for a transmit session;

receiving, by the remote controlling DC, an indication that the member has completed a transmit session; and sending, by the remote controlling DC to the call controlling DC, an indication that the member has completed the transmit session.

23. The method of claim 15 further comprising:
sending, by the remote controlling DC to the call controlling DC, an indication to terminate support of the dispatch group call request.

24. The method of claim 15 further comprising:
receiving, by the remote controlling DC from the call controlling DC, an indication to terminate support of the dispatch group call request.

25. The method of claim 15 further comprising:
receiving, by the remote controlling DC from the call controlling DC, an indication of a present local call state;
comparing, by the remote controlling DC the present remote call state and the present local call state; and
sending, by the remote controlling DC to the call controlling DC, an indication that a present remote call state is synchronized with the present local call state.

26. A communication controller comprising:
a network transceiver; and
a processor adapted to perform, using the network transceiver,
receiving a dispatch group call request targeting a talkgroup served remotely by at least one remote controlling DC and targeting at least one communication unit, wherein the at least one communication unit is a member of the talkgroup, wherein the dispatch group call request is received from an originating unit,
sending to the at least one remote controlling DC a request for the at least one remote controlling DC to page members of the talkgroup that each of the at least one remote controlling DC serve,
receiving from a first remote controlling DC of the at least one remote controlling DC an indication that at least one communication unit is available, and
sending to the first remote controlling DC a request for the first remote controlling DC to initialize channel resources to support a dispatch group call.

27. The communication controller of claim 26, wherein the communication controller is part of a first urban area and the remote controlling DC is part of a second urban area.

28. A communication controller comprising:
a network transceiver; and
a processor adapted to perform, using the network transceiver,
receiving a request for the communication controller to page members of a talkgroup that the communication controller serves, wherein the talkgroup is targeted by a dispatch group call request and wherein the talkgroup is served by a call controlling DC,
sending to the call controlling DC an indication that at least one communication unit is available, and
receiving from the call controlling DC a request for the communication controller to initialize channel resources to support the dispatch group call request.

29. The communication controller of claim 28, wherein the communication controller is part of a first urban area and the call controlling DC is part of a second urban area.

* * * * *